United States Patent [19]

Pitt et al.

[11] 3,914,346

[45] Oct. 21, 1975

[54] METHOD OF ESTERIFICATION OF ALKYL PHOSPHONOTHIO DIHALIDES

[75] Inventors: Harold M. Pitt; Richard A. Zeleny, both of Lafayette; Wendell E. Knoshaug, Albany, all of Calif.

[73] Assignee: Stauffer Chemical Company, Westport, Conn.

[22] Filed: May 9, 1974

[21] Appl. No.: 468,351

Related U.S. Application Data

[60] Division of Ser. No. 324,912, Jan. 19, 1973, Pat. No. 3,873,647, which is a continuation of Ser. No. 784,209, Dec. 16, 1968, abandoned.

[52] U.S. Cl............................... 260/973; 260/960
[51] Int. Cl.² ......................................... C07F 9/14
[58] Field of Search........................... 260/960, 973

[56] References Cited
UNITED STATES PATENTS
3,171,777   3/1965   Szabo et al. ................. 260/973 X

*Primary Examiner*—Anton H. Sutto
*Attorney, Agent, or Firm*—Michael J. Bradley

[57] ABSTRACT

A mono- or di-thiophosphonic acid ester such as, e.g., O-ethyl-S-phenyl ethylphosphonodithioate, is prepared by esterification of an alkyl phosphonothio dihalide with a metal alkylate and the resulting monoester is reacted with a metal phenolate under condensation conditions to produce the desired phosphonic acid ester. In the esterification step a temperature is maintained about 10° and −10°C., the metal alkylate is present as a finely divided particulate material dispersed in toluene, iron concentration is maintained at less than 50 ppm and a small percentage of water is present in order to minimize undesirable diester formation.

3 Claims, No Drawings

METHOD OF ESTERIFICATION OF ALKYL PHOSPHONOTHIO DIHALIDES

This is a division, of application Ser. No. 324,912, filed Jan. 19, 1973 U.S. Pat. No. 3,873,647, which is in turn a continuation of application Ser. No. 784,209, filed Dec. 16, 1968, now abandoned.

The present invention relates to the esterification of alkyl phosphonothio dihalides, and to the production of pesticidal thiono- and dithio-phosphonic acid esters.

The pesticidal esters which are produced in accordance with the process of the present invention are represented by the formula:

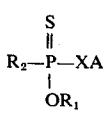

wherein $R_1$ and $R_2$ represent the same or different straight or branched chain lower alkyls having from 1 to 6 carbon atoms, inclusive, preferably from 1 to 4 carbon atoms, X is a member selected from the group consisting of oxygen and sulfur, and A is a member selected from the group consisting of alkyl, cycloalkyl, phenyl or substituted phenyl, wherein the substituents are selected from the group consisting of chlorine, bromine, iodine, lower alkyl, lower alkoxy, nitro and cyano. The process of the present invention is particularly useful for producing a wide variety of esters such as are described in U.S. Pat. Nos. 2,988,474, 3,149,143, 3,253,061 and 3,361,855. Examples of such esters include: O-ethyl-S-phenyl-ethylphosphonodithioate, O-ethyl-S-p-tolyl-ethylphosphonodithioate, O-ethyl-S-o-tolylethylphosphonodithioate, O-ethyl-S-(p-tert.-butylphenyl)-ethylphosphonodithioate, O-ethyl-O-(3,4-dichlorophenyl)methylphosphonothioate, methylthionophosphonic acid-O-methyl-O-p-nitrophenol ester and O-ethyl-2,4,5-trichlorophenyl ethylphosphonothioate.

In accordance with one aspect of this invention an alkyl phosphonothio dihalide is esterified by reaction with a metal alkylate, preferably in the presence of a suitable organic solvent to make the corresponding mono esters. Diesters are usually produced as the result of side reactions. The monoester is then reacted with a metal phenolate, which includes metal salts of phenol, thiophenol or substituted derivatives thereof, under condensation conditions to produce the desired thiono- or dithio-phosphonic acid ester. These reactions are depicted below in general terms:

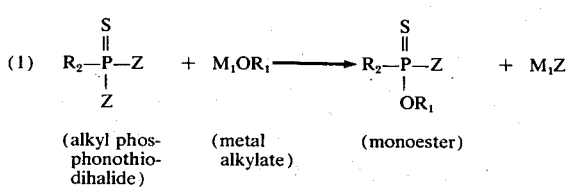

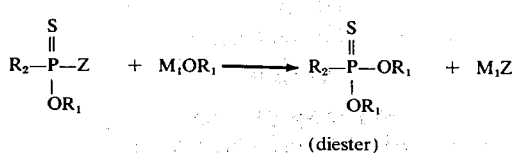

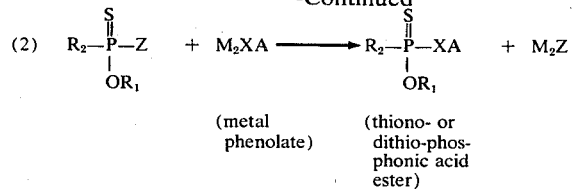

In the formulae set forth above, $R_1$, $R_2$, X and A have the same significance as previously defined; $M_1$ and $M_2$ are selected from the group consisting of Na, K, Li, Ca and Mg, and Z is a halide such as chlorine, bromine or iodine.

Referring to the esterification step the alkyl phosphonothio dihalide is reacted with a metal alkylate preferably in the presence of an organic solvent such as toluene, hexane, benzene, xylene or the like to produce the corresponding monoester. Preferably, this reaction is carried out in a suitable corrosion resistant zone, e.g., a glass lined reactor, into which is charged the alkyl phosphonothio dihalide. A mixture containing the metal alkylate, preferably in the form of a finely dispersed particulate material, and a suitable organic solvent is introduced into the reaction zone at a desired rate. A high degree of admixing of the solvent and metal alkylate is important and is preferably achieved by introducing the mixture into the impeller of a recirculation pump servicing the esterification reactor.

In the practice of this invention, it has been found that a substantial amount of undesired diester is formed, as well as the monoester, in the esterification step. The diester appears to be formed by the side reaction of the monoester and the metal alkylate. Since this side reaction consumes the needed monoester, it is desirable to minimize this reaction.

The following have been found to affect the diester formation by the side reaction.

Minimizing diester formation in the esterification step is accomplished, in accordance with the present invention, by reacting the metal alkylate with the alkyl phosphonothio dihalide at a temperature between about 110°C. to about −40°C., preferably between about −10° and about 30°C., and most preferably between about −10° and about 10°C. It has been found that diester formation is enhanced at elevated temperatures where other variables are held constant. The esterification is also preferably conducted in the presence of a small percentage of water. While the percentage of water varies depending upon the particular reactants, it has been found that the presence of from 0.1 to about 5 percent water, and preferably about 0.5 to about 2 percent water is helpful in minimizing diester formation. These percentages refer to weight percent of water based on the weight of alcohol reacted with the metal alkylate as will be apparent from further description.

The presence of iron in the reaction mixture, e.g., as $FeCl_3$, has been found to promote diester formation. It has been noted that the presence of 500 ppm of iron causes an increase in diester formation while the presence of only 50 ppm appears to have no affect on diester formation. It is thus preferred to maintain less than about 500 ppm of iron (based on the total weight of reactants for the esterification step) in the esterification zone.

It has been further found that the metal alkylate is preferably present in the esterification step in the form of finely dispersed particulate material in order to minimize diester formation. Greater diester formation occurs when the metal alkylate is dissolved in alcohol than when it is prepared and used in dispersed particulate form.

The metal alkylate can be prepared in dispersed particulate form for use in conjunction with the process of this invention in the following manner. A suitable metal is introduced to a suitable organic solvent such as, e.g., toluene (or like solvents previously mentioned), and the medium is heated to a temperature above the melting point of the metal to melt it. A suitable alcohol is admixed with the molten metal thereby forming finely divided metal particles dispersed in the organic solvent. Where water addition is desired it can be accomplished by addition of water either to the alcohol prior to its admixture with metal or subsequent to formation of the metal alkylate in the organic solvent. The percentages of water hereinbefore discussed refer to weight percent of water based on the weight of alcohol admixed with the metal.

It has also been discovered in the practice of the present invention, that the addition of water to the alcohol prior to reacting the alcohol with the metal to form the solid metal alkylate dispersion or the addition of water to the metal alkylate prior to the esterification significantly decreased the diester formation. The added water appears to improve the dispersion of the solid metal alkylate in the suitable solvent, thus allowing the monoester to be formed with a minimum of diester formation resulting from the side reaction.

The monoester is then passed to the condensation step to form the desired thiono- or di-thiophosphonic acid ester. The monoester is preferably added to an excess of metal phenolate. Addition of the monoester to the metal phenolate inhibits the formation of the emulsion which results when the metal phenolate is added to the monoester. The reaction mixture is preferably maintained at a temperature between about 60° and about 100°C. for a period of from about 0.5 to about 4 hours and most preferably at a temperature between about 80° and about 100°C. for a period of between about 1 and about 2 hours. When the condensation step is operated at elevated pressures the reaction zone can be maintained at much higher temperatures. It has been found that the pH of the reaction zone is dependent on the metal phenolate used. Where the metal phenolate is sodium thiophenate, the pH of the reaction mixture should be maintained between about 5 and about 14. It is preferable to maintain the reaction mixture at a pH between about 10 and about 13 independent of the metal phenolate used.

The resulting thiono- or dithio-phosphonic acid ester is purified by distillation at pressures between about 12 and about 30 mm. Hg. and at temperatures between about 115° and about 135°C. The use of a falling film evaporator unit minimizes the thiono- or dithiophosphonic acid ester's decomposition during purification at the elevated temperatures. This purification removes most of the remaining organic solvent, monoester, and diester.

Having thus generally described the method of producing thiono- or dithiono-phosphonic acid esters, reference is now made to the following examples.

EXAMPLE I

This example illustrates the method of making solid dispersed sodium ethylate. The equipment consists of a two liter round bottom four neck flask equipped with a stirrer, reflux condenser, charging funnel, thermometer and nitrogen purge. The flask is heated by means of a heating mantle. The vent gases from the top of the reflux condenser enter a trap and then pass through a toluene filled bubbler before discharging.

Runs are conducted as follows: 650 cc. (6.12 gram moles) of dry toluene are added to the flask. The flask is purged with dry nitrogen and then 31.5 grams (1.37 gram moles) of oxide free sodium metal are charged to the flask in the form of small chunks. The flask is heated to reflux at about 110°C and the agitator is started after the sodium melts. The charging funnel is loaded with 90 cc. (1.54 gram moles) of absolute ethanol to which 1% by weight water is added, based on weight of ethanol.

The ethanol is started at a slow rate and is fed over a period of three hours. During the course of the reaction the temperature of the flask is maintained at about 105°–106°C. and stirring is continued. As the reaction proceeds the reaction mass becomes highly viscous. At the end of three hours, the reaction mass is cooled to room temperature. The product is a white, viscous slurry of finely divided sodium ethylate dispersed in toluene. This material is stored for use in the esterification.

EXAMPLE II

This example illustrates the preparation of O-ethyl ethylphosphonothioate by the esterification of ethylthiophosphonyl dichloride with sodium ethylate. The equipment consists of a one liter, 4 neck, round bottom flask equipped with a stirrer, thermometer, 500 ml. charging funnel, and nitrogen purge. The charging funnel is also equipped with a stirrer. Cooling is done with a dry ice-isopropanol bath. 203 grams (1.25 gram moles) of ethylthiophosphonyl dichloride are loaded into a purged flask. 500 cc. of sodium ethylate prepared in accordance with Example I are loaded into the charging funnel and the agitator is started. The agitator on the reaction flask is started and the flask is cooled to the desired reaction temperature with the cooling bath. The sodium ethylate is initially fed to the bath at a slow rate and the cooling bath adjusted to hold the reaction temperature at about 0°–5°C. Samples of the reaction mixture are taken at periodic intervals, centrifuged to remove suspended sodium chloride and analyzed by gas chromatography in order to determine completion of the reaction. Sodium ethylate is added until less than 1% of the initial ethylthiophosphonyl dichloride charge remains. The total time for addition of sodium ethylate is about three hours. About 93 weight percent of monoester is produced based on the ethylthiophosphonyl dichloride reacted.

EXAMPLE III

The results of various experiments, which are conducted in accordance with the procedure set forth in Example II, are presented in Table I. These results indicate the influence of variations in temperature of the esterification reaction, iron concentration, and water concentration on the formation of diester.

EXAMPLE IV

O-ethyl S-phenyl ethyl phosphonodithioate is made from monoester which is prepared in accordance with Example II in a condensation step which is carried out as follows. This reaction is carried out in a 2 liter, 4 neck, round bottom flask equipped with a stirrer, thermometer, condenser and charging funnel. The flask is heated with a mantle. A sodium thiophenate solution is made up by charging 170 grams of 25 wt. % caustic (1.062 gram moles of NaOH) and 108.8 grams (0.987 gram moles) of thiophenol alcohol are charged to the reactor over a period of two hours. The maximum temperature of the solution in the reactor is 4.5°C. When the addition of the sodium ethylate solution is completed, the reactor temperature is brought to 26°C. The ethanol and salt in the reactor are extracted by the addition of 125 lbs. of water. The lower aqueous phase is decanted and the washing step is repeated. The product phase is then heated and the

TABLE I

| RUN NO. | ESTERIFICATION TEMPERATURE °C. | WT. % WATER IN ETHANOL | IRON CONCENTRATION PPM OF TOTAL REACTANT WEIGHT | WT. PERCENT OF DIESTER IN ESTERIFICATION PRODUCT |
|---|---|---|---|---|
| 1 | 30 | 0.01 | 50 | 13 |
| 2 | 30 | 1.0 | <50 | 9 |
| 3 | 30 | 3.0 | <50 | 9 |
| 4 | −10 | 0.01 | <50 | 10 |
| 5 | 0–5 | 1.0 | <50 | 5 |
| 6 | 30 | 0.01 | 500 | 23 | to the flask with the stirrer in operation. The reaction goes to completion in a few minutes. About 100 cc. of toluene are added to the flask to extract the diphenyl disulfide. The flask is stirred for a few minutes and then the phases are allowed to separate. The organic phase (top) is syphoned off.

The following quantities of materials are loaded into the charging funnel for the condensation reaction:

|  | grams | gram moles |
|---|---|---|
| Distilled O-ethylethylthiophosphonyl chloride | 150.0 | 0.869 |
| ethylthiophosphonyl dichloride | 1.0 | 0.0061 |
| O,O-diethyl ethylphosphonothioate | 4.0 | 0.022 |
| sodium chloride | 50.9 | 0.87 |
| toluene | 292 cc. |  |
| ethanol | 5 cc. |  |

The sodium thiophenate solution is heated to about 80°C. and the monoester solution is added over a period of a few minutes. The reaction mixture is brought to the reflux temperature of about 95°C. and is held there until the reaction is completed. Samples are withdrawn periodically and analyzed for completion by gas chromatographic methods. The reaction is completed in 45 minutes. At this point, there is less than 1% of the unreacted monoester remaining. At the completion of the reaction, approximately 300 cc. of water are added to dissolve the sodium chloride.

The reaction mass is cooled to room temperature and the phases are separated. The organic phase is stripped in a rotary film evaporator to remove the toluene. Stripping is done at about 1 mm. of Hg and about 60°C. maximum temperature.

The yield is 206.7 grams of product and the purity is 97.5%. The yield of O-ethyl S-phenyl ethyl phosphonodithioate from the monoester is 91.1%.

EXAMPLE V

The monoester of ethylthiophosphonyl dichloride is prepared by charging fifty gallons of benzene and 81.5 lbs. of ethylthiophosphonyl dichloride to a 200 gallon jacketed glass lined reactor. The resulting solution is agitated and cooled to −5°C. One hundred ninety-eight pounds of sodium ethylate solution dissolved in ethyl alcohol are charged to the reactor over a period of two hours. The maximum temperature of the solution in the reactor is 4.5°C. When the addition of the sodium ethylate solution is completed, the reactor temperature is brought to 26°C. The ethanol and salt in the reactor are extracted by the addition of 125 lbs. of water. The lower aqueous phase is decanted and the washing step is repeated. The product phase is then heated and the benzene water azeotrope mixture is removed under a final temperature and vacuum of 55°C. and 22 in. Hg., respectively. The product is then cooled to 20°C. and is transferred to a 100 gallon still pot for fractionation. The low boiling cut is removed, followed by the collection of the monoester product starting at 118°C. and 35 mm. Hg., and finalizing at 122°C. and 23 mm. Hg. The purity of the product is 94.5% O-ethylethylthiophosphonyl chloride.

EXAMPLE VI

The monoester of Example V is reacted with sodium thiophenate to form O-ethyl S-phenyl ethyl phosphonodithioate as follows. 36.2 lbs. of thiophenol are charged to 53.7 lbs. of a 24.5% sodium hydroxide solution in 159 lbs. of benzene to form sodium thiophenate. The reaction mix is then heated to 50°C. to complete the reaction. 55.1 lbs. of monoester are prepared as in Example V and are charged to the sodium thiophenate solution over a period of one hour. The reaction temperature is raised to 80°C. for the completion of the reaction of the monoester to O-ethyl S-phenyl ethyl phosphonodithioate. The reaction mixture is then cooled to 22°C. and 5 gallons of water are added to solubilize the salt that is formed during the reaction. The lower aqueous phase is decanted and the water addition and decantation steps are repeated.

The crude O-ethyl S-phenyl ethyl phosphonodithioate is heated under vacuum, and the benzene-water azeotropic mixture is removed. The product is further purified by the removal of benzene under a vacuum of 30 mm. Hg. and at a temperature of 86°C. The final purity of the O-ethyl S-phenyl ethyl phosphonodithioate is 89.1%.

Having thus described the invention, with reference to specific examples thereof, it is to be understood that other modifications, alterations and applications will become apparent to those skilled in the art without departing from the scope of the present invention and that the present invention is limited only as defined in the claims appended hereto.

We claim:

1. Reacting a compound of the formula

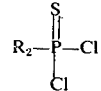

wherein $R_2$ is lower alkyl having from 1 to 4 carbon atoms with sodium alkylate of the formula, $NaOR_1$, wherein $R_1$ is alkyl from 1 to 4 carbon atoms at a temperature between about 110 and about $-40°C$., and in the presence of from 0.1 to about 5% water to produce a monoester in accordance with the formula

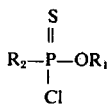

2. The process of claim 1 in which the reaction is carried out in the presence of an organic solvent and said $NaOR_1$ is present as a finely divided particulate material dispersed in said solvent.

3. The process of claim 1 in which $R_2$ is ethyl, and $R_1$ is ethyl.

* * * * *